Figure 1:
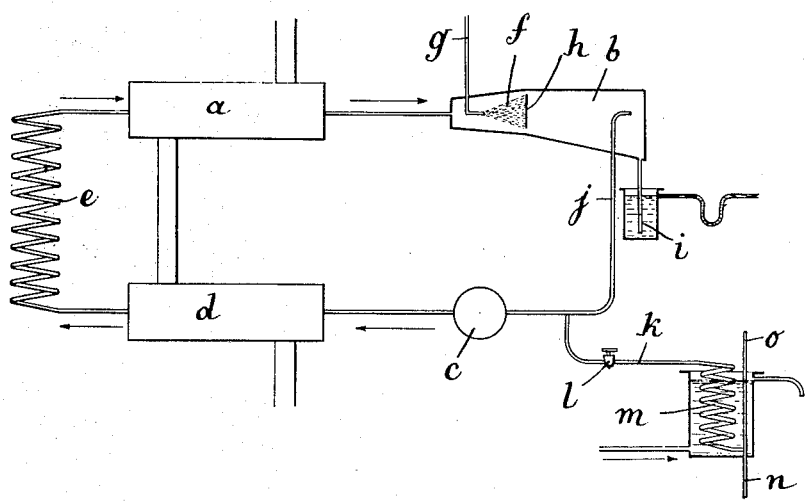

Sept. 1, 1925.

H. DUPUY 1,551,814

APPARATUS FOR THE DISTILLATION OF SOLID OR LIQUID SUBSTANCES

Filed May 14, 1923    3 Sheets-Sheet 1

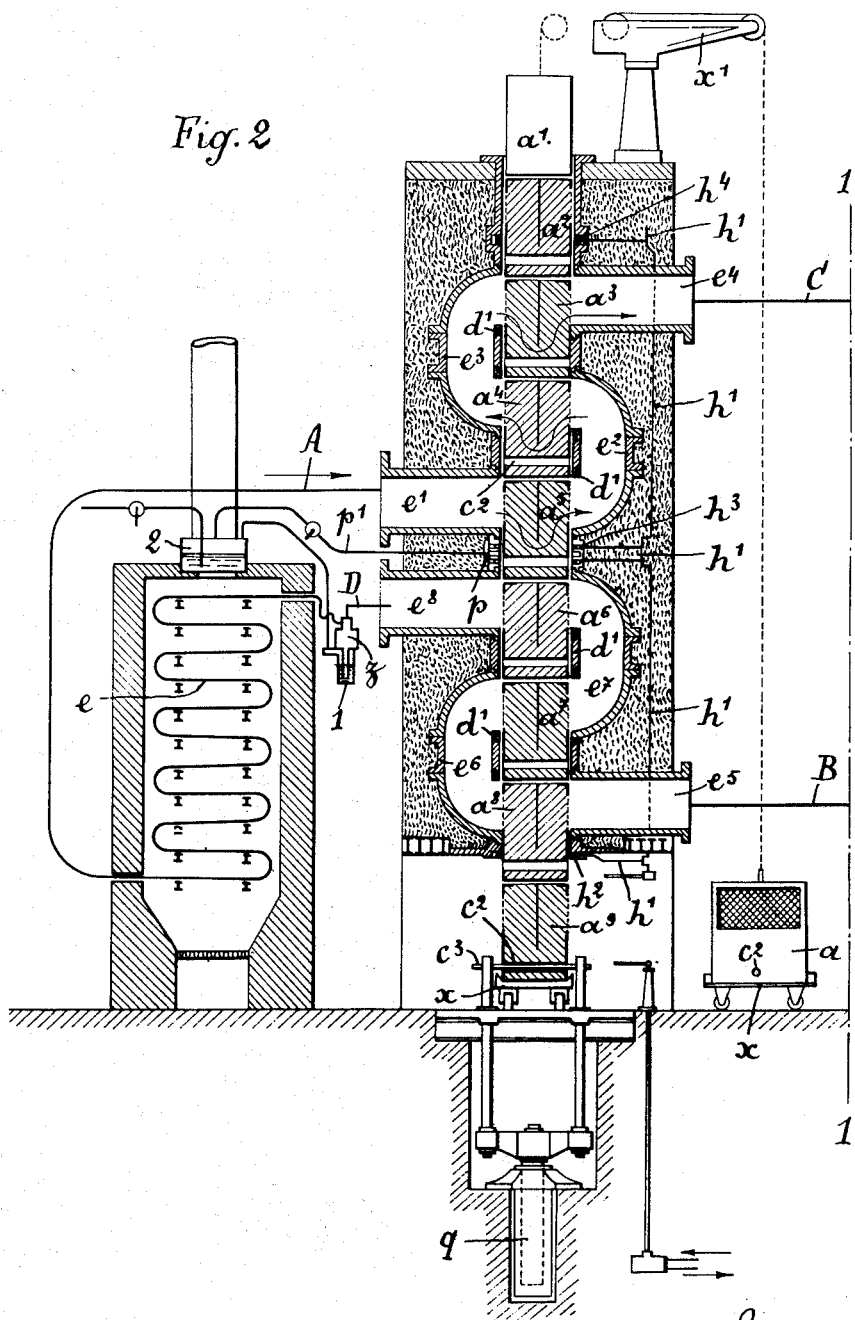

Sept. 1, 1925.
H. DUPUY
1,551,814
APPARATUS FOR THE DISTILLATION OF SOLID OR LIQUID SUBSTANCES
Filed May 14, 1923     3 Sheets-Sheet 3
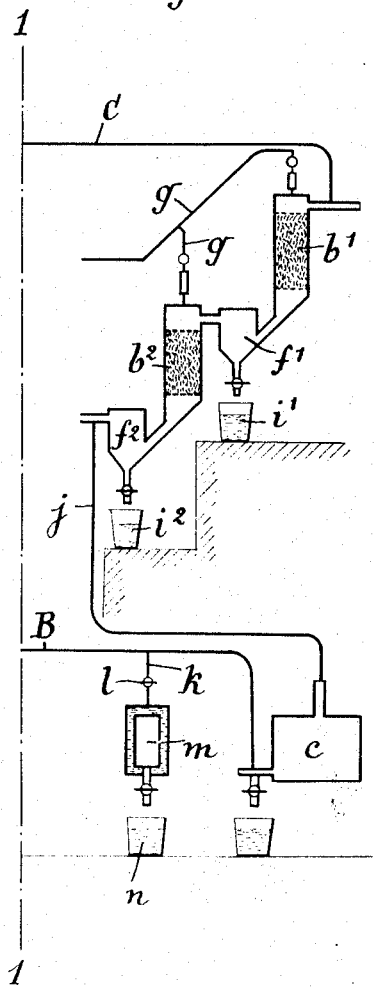
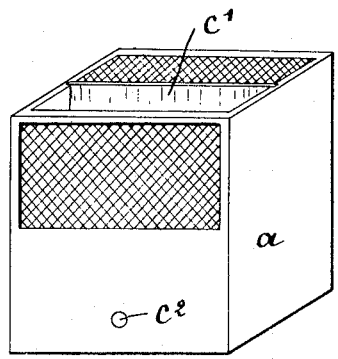
Inventor
Henri Dupuy.

Patented Sept. 1, 1925.

1,551,814

UNITED STATES PATENT OFFICE.

HENRI DUPUY, OF PARIS, FRANCE.

APPARATUS FOR THE DISTILLATION OF SOLID OR LIQUID SUBSTANCES.

Application filed May 14, 1923. Serial No. 638,878.

*To all whom it may concern:*

Be it known that I, HENRI DUPUY, a citizen of the Republic of France, residing in Paris, France, have invented certain new and useful Improvements in Apparatus for the Distillation of Solid or Liquid Substances; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an apparatus for the distillation of all solid or liquid substances in which the same are distilled by means of a gaseous fluid, for instance water vapour, at a suitable temperature, which is caused to traverse the mass under treatment and draws over the products of distillation. In this apparatus the distilling chamber is not in contact with a furnace, and the calories are brought solely by a gaseous vehicle, so that the distillation is effected in a very different manner from the known processes, and without decomposition or polymerization of the distilled products, and as a rule at a lower temperature and in a much shorter time.

The invention has essentially for its object to provide for the maximum recuperation of the heat brought by the products under treatment themselves, as well as of the latent heat of the gaseous fluid conveying the heat, i. e. the recuperation of substantially the whole amount of the calories used for the distillation.

The apparatus is chiefly adapted for the distillation of coal and of agglomerates having coal as a base, and the gaseous fluid may in this event consist of water vapour or steam, which is produced by injecting water into the condensing chamber of the apparatus so as to insure in a direct manner the first condensation of the volatile products which are drawn over, and this constitutes one of the essential features of the invention. Another important feature consists in the use of a branch circulation of the products, of a determined and adjustable value, which is taken off along the path of the products of distillation after the first condensation, and this while providing for the regulation of the internal pressure of the arrangement, will also insure the recuperation of an additional part of the volatile matter which has escaped the main condensation.

The invention further comprises an improved constructional form of the apparatus which is more especially constructed for the distillation of combustibles or coal agglomerates.

Fig. 1 of the appended drawings is a diagrammatic general view of a form of the apparatus in accordance with the invention which is chiefly applicable to the treatment of coal or coal agglomerates.

Fig. 2 is a diagrammatic vertical section of a furnace of the vertical type, according to the invention.

Fig. 2$^a$ is a diagrammatic view showing the condensing chambers, tar separators, pump and refrigerator connected with the furnace shown in Fig. 2 and forming part of the apparatus.

Fig. 3 is a perspective view of one of the furnace boxes, Fig. 2.

As shown in Fig. 1, the apparatus comprises a distilling furnace $a$, a condensing chamber $b$, a fan $c$, a cooling chamber $d$ and a superheater $e$.

In the furnace $a$ are disposed the substances to be distilled, whose distillation is effected under the action of a stream of superheated steam supplied by the superheater $e$; the superheated steam passing through the furnace $a$ becomes charged with volatile matter and its initial temperature becomes reduced, for example to approximately 250° C.

The distilled products drawn by the steam into the condensing chamber $b$ are condensed for the major part by a water spray $f$ produced by the action of water which is supplied by a pipe $g$, the stream of which impinges upon a plate $h$. The greater part of the condensable substances are collected at the bottom of the said chamber $b$ at $i$.

Should the amount of the water spray in the chamber $b$ be such that the superheated steam circulating in the device is saturated, the temperature of the whole will fall to 100° C. so that all substances condensable at this temperature will stream down the walls which are placed in the gas current and will collect at the bottom of the chamber $b$.

The products escaping distillation herein will issue through the pipe $j$ in which the fan $c$ operates. From the said pipe $j$ and before it reaches the said fan $c$, is taken off a branch pipe $k$ which is provided with a control cock or valve $l$ and ends in a refrigerating condenser $m$. The condensed substances and the water are collected at $n$ and the non-condensable gases escape at $o$.

Obviously, the internal pressure of the circuit would tend to increase, since the gases of distillation and the vapour produced in the chamber $b$ will be added to the initial gaseous mass. This will produce a branch current flowing through the pipe $k$ and proceeding to the condenser $m$, and this current can be regulated according to the internal pressure, by means of the said control valve $l$. The volatile substances which are not collected in the condensing chamber $b$, as well as the non-condensable gases, will finally reach the condenser $m$, and this movement will be more active depending upon the amount which is given off.

The cooled vapor discharged from the fan $c$ will proceed into the cooling device $d$ in which have been disposed the distilled substances from the furnace $a$; the vapour becomes heated upon contact therewith and removes the major part of the heat which they still contain, thence proceeding into the superheater $e$ in which it is brought to the initial temperature.

It is obvious that by reason of the heat of the material under distillation, the process may be carried out with a relatively small amount of fuel, in practice, as regards the heating of the said superheater, and further, owing to the double and successive condensation of the distilled products, almost the whole amount of the latter can be condensed and collected.

In the said apparatus, superheated steam is employed for treating coal in lumps or as agglomerate (e. g. coal eggs), but the same principles of recuperation and condensation may be carried into effect by the use of a heated gas of any kind, and all other suitable substances can be treated, the water vapour produced at $b$ being added to the original volume of gas employed.

Should it be desired to effect the total condensation of the distillation products in one operation, the device $b$ is eliminated. When a gas of any kind is used, it is simply necessary to connect the circuit with a gas holder containing the gas.

If water vapour (or steam) is employed, one may recover the latent heat of vaporization of the same in a boiler for example of the Prache-Bouillon type. For liquids the superheated gas will be made to stream directly through the liquid and in this event the recuperation of the heat of the hot liquid can be dispensed with.

Instead of employing a furnace $a$ and a cooling device $d$ in separate disposition, another arrangement would be to make use of a multiple-way cock or valve so that the material under treatment shall be disposed in a given chamber, then sending into the chamber firstly the superheated gas and secondly the cooled gas in order to recover the calories.

In the form of construction of furnace shown in Fig. 2, the material under treatment is preliminarily loaded into the containers $a$ consisting of a square box open at the top whereof two sides are solid and the other two have gratings at the upper part, Fig. 3; a middle partition $c^1$ parallel to the sides serves to divide the said box into two chambers, the partition being stopped somewhat above the bottom of the box, a pipe $c^2$ passes through the lower part, as will be further set forth.

The upper part of the said furnace shown in Fig. 2 has the form of a vertical continuous furnace and serves for the distillation, the lower part being used for the recuperation of heat and the cooling of the products. The whole is traversed from top to bottom by a central shaft which contains the boxes full of material piled upon each other; two boxes $a^1$ and $a^2$ are shown awaiting distillation and below them are three boxes $a^3$, $a^4$, $a^5$ whose material is being distilled, then come three other boxes $a^6$, $a^7$, $a^8$ which are being cooled off, and lastly the box $a^9$ disposed on the wheeled truck $x$ out of the circuit and ready for removal.

The gaseous fluid from the superheater $e$ enters through the horizontal conduit $e^1$, passes through the material in the box $a^5$, through the conduit $e^2$ and through the box $a^4$, thence traversing the conduit $e^3$ and issuing through the nozzle $e^4$. The fluid again enters the furnace through the nozzle $e^5$, the box $a^8$, the conduit $e^6$, the box $a^7$, the conduit $e^7$, the box $a^6$ and the nozzle $e^8$. The solid parts $d^1$ of the furnace correspond to the solid parts of the boxes so as to form a relatively tight joint having a greater resistance to the gas flow than what is offered by its passage through the boxes by way of their gratings. For a given amount of play, this resistance depends upon the length of the joint, and it can be made sufficient to retain the gas. This point may have little importance as regards the entire furnace, but it requires great care in the upper part between the two operating regions and also at the bottom where the discharge takes place. For greater safety, one may utilize any suitable means for obtaining fluid tight conditions, which are controlled for example by hand cranks and eccentrics $h^1$, so as to bring asbestos covered packing surfaces $h^2$, $h^3$, $h^4$ into contact with the said boxes when the latter are in place.

Further, between the two regions, there is provided an annular space $p$ connected by a channel $p^1$ with the boiler 2 serving to recuperate the waste heat of the furnace. The steam which would tend to escape through the central joint will rise or descend while mingling without inconvenience with either circuit but providing for the effective separation of these two circuits.

At the lower part of the furnace is disposed a jack $q$ for operating the whole of the said boxes at regular intervals. The pipes $c^2$ disposed at the lower part of the boxes $a$ have inserted therein the bars $c^3$ which are acted upon by the said jack, so that the lower box can be held up and can thus be placed upon a small wheeled truck $x$.

An elevating apparatus of any suitable type $x^1$ serves to lift the loaded boxes to the top of the furnace.

The pipes A, D ending in the nozzles $e^1$, $e^3$ communicate respectively with the ends of the superheater $e$. The pipe B which is connected at one end with the nozzle $e^5$ communicates at the other end with the apparatus $c$, for example a pump, providing for the general movement of the gases in the apparatus. The pipe C connected with the nozzle $e^4$ communicates with the devices for condensing the products of distillation. These latter devices consist of condensing chambers $b^1$, $b^2$ etc., provided with a water spray, as shown in Fig. 1. In the improved arrangement shown in Fig. 2ª, the condensing chambers $b^1$, $b^2$ etc., preferably consist of columns filled for instance with very short metal tubes upon which is caused to flow the injection water supplied by the tubes $g$. In this manner the heat is very rapidly given up, and the permeability to gases remains excellent. The condensed products flow into the tar separators $f^1$, $f^2$ etc., for example separators of the contrifugal or of the Pelouze type, at the bottom whereof the condensed products are collected at $i^1$, $i^2$ etc. The last separator is connected with the apparatus $c$ by the pipes $j$. The temperature obtained by the addition of water will vary with the amount of water added. Obviously it would be an easy matter by using in series any suitable number of the devices $b^1$, $f^1$, $b^2$, $f^2$ . . . . etc., to provide for a fractioning of the condensation of the distilled products. For instance, one might obtain the fractioning of the condensed oils from coal at temperatures of 230, 170 and 110° C. by circulating the gases successively through saturators and tar removing devices which are respectively maintained at the said temperatures.

These successive cooling operations and tar removals which are comprised between the temperature of the gases issuing from the carbonizing chambers and 100° C. will obviate the use of fuel which must be burned for the succeeding distillation of the tar. The same principle can be applied as concerns the branch pipe $k$, and this will for instance insure the separation of ammonia gas from the water.

The apparatus shown in Figs. 2 and 2ª is operated as follows:

Considering the tube A wherein is circulated the fluid issuing from the superheater $e$ at the maximum temperature chosen for the distillation, the fluid passes through the boxes $a^5$, $a^4$, $a^3$ placed in the region of distillation, and then passes through the tube C into the water-supplied condensers $b^1$, $b^2$ etc., and the tar separators $f^1$, $f^2$ etc. and traverses the apparatus $c$ which produces the movement of the gases; a part of the fluid enters the branch $k$ and the condenser $m$ and the remainder passes through the tube B and the boxes $a^8$, $a^7$, $a^6$ disposed at different cooling points, and recuperates the calories in the distilled products; it passes then through the tube D and returns to the superheater $e$ in order to become sufficiently heated and to proceed through the tube A, and so on. Obviously at the proper moment the column of boxes will be lowered by one unit, so that the box $a^2$ shall come into the region of distillation and the box $a^5$ into the region of cooling whilst the box $a^8$ will descend so as to be placed upon the said truck, the cooled box $a^9$ having been removed.

The box $a^8$ which is out of the circuit can now be removed from the furnace without danger of ignition inasmuch as it has been cooled by gas at 100° C. for the same length of time as it was heated and by an equal amount of gas.

To obviate the danger resulting from excessive variations of pressure, it is advisable to mount in the circuit D and adjacent the superheater a reservoir $z$ immersed in a small water tank 1.

The top of the said tank is in constant communication with a small boiler 2 disposed on the superheater and using solely the waste heat; a very sensitive valve mounted upon the said boiler serves to limit maximum pressure to the atmospheric pressure. Should an increase of pressure occur in the circuit, the water seal of the said tank 1 will be overcome and the steam will flow into the boiler 2 and will escape into the atmosphere. If on the contrary a vacuum is produced, the water contained in the said tank 1 will rise in the reservoir $z$ and the vapour will rush from the boiler 2 into the circuit so as to restore the pressure. The amount of steam supplied by the boiler will depend upon the degree of the vacuum.

The device as a whole and all the piping will of course be carefully insulated.

Obviously, the said vertical furnace is shown solely by way of example of an approved apparatus, and the various elements of the furnace may be arranged in any other suitable manner in accordance with the requirements of each particular case.

Having now particularly described and ascertained the nature of my said invention and in what manner the same is to be performed, I declare that what I claim is:—

1. An apparatus for the distillation of solid and liquid substances comprising in combination a furnace with a vertical passage or shaft, a plurality of removable boxes superposed in the said shaft whereof a certain number contain the material to be distilled and the remainder the material already distilled, a series of fractionating condensers adapted to receive the vapours of distillation issuing from the boxes containing the material to be distilled, water inlets in the said condensers, means provided in the said condeners for subdividing and for spraying the said water whereby it shall form water vapour entering the gaseous circuit of the apparatus, a branch circuit comprising a condensing device and connected at the outlet side of the main condensers, a device for superheating the gaseous vapours and the water vapour circulating in the apparatus, tubes connecting said elements of the apparatus in a closed cycle, and means for circulating the vapours and for causing the same to flow successively through the said boxes containing the material under distillation, into the said condensers, into the boxes containing the already distilled material and thence into the superheater.

2. An apparatus for the distillation of solid and liquid substances comprising in combination a furnace with a vertical passage or shaft, a plurality of boxes disposed in the said shaft, a portion of the walls of said boxes being apertured for the circulation of the gaseous fluid, a certain number of the said boxes containing the material to be distilled and the remainder the material already distilled, a series of condensers for successive fractionation adapted to receive the products of distillation issuing from the boxes containing the material to be distilled; water inlets for the said condensers, means provided in the said condensers for subdividing and for spraying the said water whereby it shall form water vapour entering the gaseous circuit of the apparatus, a branch circuit comprising a condensing device and connected at the outlet side of the main condensers, a device for superheating the gaseous vapours and the water vapour circulating in the apparatus, pipes connecting the said elements of the apparatus in a closed cycle, and means for circulating the vapours and for causing the same to flow successively through the said boxes containing the material under distillation, into the said condensers, into the boxes containing the already distilled material and thence into the superheater.

3. An apparatus for the distillation of solid and liquid substances comprising in combination a distilling furnace, boxes disposed in the said furnace whereof a portion contains the material to be distilled and the remainder of the material already distilled, a plurality of condensers disposed in series and adapted to receive the products of distillation, means for feeding and injecting water into the said condensers and adapted for spraying the water whereby it shall form water vapour entering the gaseous circuit of the apparatus, a series of tar separators combined with the said condensers, a branch circuit comprising a condensing device and connected at the outlet side of the main condensers, a device for superheating the gaseous vapours and the water vapour circulating in the apparatus, pipes connecting the said elements of the apparatus in a closed cycle, and means for circulating the vapours and for causing the same to flow successively through the said boxes containing the material under distillation, into the said condensers, into the boxes containing the already distilled material and thence into the superheater.

4. An apparatus for the distillation of solid and liquid substances comprising in combination a distilling furnace, boxes disposed in the said furnace whereof a portion contain the material to be distilled and the remainder the material already distilled, a series of condensers for successive fractionation adapted to receive the products of distillation, means for feeding and injecting water into the said condensers and adapted for spraying the water whereby it shall form water vapour entering the gaseous circuit of the apparatus, a branch circuit comprising a condensing device and connected at the outlet side of the main condensers, a device for superheating the gaseous vapours and the water vapour circulating in the apparatus, pipes connecting the said elements of the apparatus in a closed cycle, a safety device with water seal disposed on the main piping, and means for circulating the vapours and for causing the same to flow successively through the boxes containing the material under distillation, into the condensers, into the boxes containing the already distilled material and thence into the superheater.

5. An apparatus for the distillation of solid and liquid substances comprising in combination a distilling furnace, boxes disposed in the said furnace whereof a portion contain the material to be distilled and the remainder the material already distilled, a series of condensers for successive fractionation adapted to receive the products of distillation, means for feeding and injecting water into the said condensers and adapted for spraying the water whereby it shall form water vapour entering the gaseous circuit of the apparatus, a branch circuit comprising a condensing device and connected at the outlet side of the main condensers, a device for superheating the gaseous vapours and the water vapour circulating in the apparatus, an auxiliary boiler heated by the waste heat of the superheater and adapted to supply additional water vapor when required, pipes connecting the said elements of the apparatus in a closed cycle, and means for circulating the vapours and for causing the same to flow successively through the boxes containing the material under distillation, into the condensers, into the boxes containing the already distilled material and thence into the superheater.

In testimony that I claim the foregoing as my invention, I have signed my name.

HENRI DUPUY.